(12) United States Patent
Ahoubim

(10) Patent No.: US 10,252,677 B2
(45) Date of Patent: Apr. 9, 2019

(54) FOOTWEAR AND ACCESSORY RETENTION POUCH FOR USE IN VEHICLES

(71) Applicant: Tanaz Ahoubim, Encino, CA (US)

(72) Inventor: Tanaz Ahoubim, Encino, CA (US)

(*) Notice: Subject to any disclaimer, the term of this patent is extended or adjusted under 35 U.S.C. 154(b) by 14 days.

(21) Appl. No.: 15/490,634

(22) Filed: Apr. 18, 2017

(65) Prior Publication Data

US 2018/0297534 A1    Oct. 18, 2018

(51) Int. Cl.

| | |
|---|---|
| *B60R 7/04* | (2006.01) |
| *A45C 3/12* | (2006.01) |
| *A45C 13/02* | (2006.01) |
| *A45C 11/00* | (2006.01) |
| *A45F 3/02* | (2006.01) |
| *A45F 3/04* | (2006.01) |
| *A45F 4/00* | (2006.01) |
| *A45C 9/00* | (2006.01) |
| *H02J 7/00* | (2006.01) |
| *B60R 11/00* | (2006.01) |
| *B60R 7/08* | (2006.01) |
| *A45F 3/00* | (2006.01) |

(52) U.S. Cl.
CPC ............... *B60R 7/043* (2013.01); *A45C 3/12* (2013.01); *A45C 9/00* (2013.01); *A45C 11/00* (2013.01); *A45C 13/02* (2013.01); *A45F 3/02* (2013.01); *A45F 3/04* (2013.01); *A45F 4/00* (2013.01); *B60R 7/08* (2013.01); *B60R 11/00* (2013.01); *H02J 7/0042* (2013.01); *A45C 2009/007* (2013.01); *A45C 2011/001* (2013.01); *A45F 2003/001* (2013.01); *B60R 2011/0017* (2013.01); *B60R 2011/0059* (2013.01)

(58) Field of Classification Search
CPC ..... B60R 2011/0007; B60R 2011/0059; B60R 2011/0276; B60R 2011/0012; B60R 2011/0014; B60R 2011/0003; B60R 7/043; B60R 7/005; B60R 7/04; B60R 7/00; B60N 2002/4405; A45C 3/12; A45C 2009/007
USPC ........ 224/275, 572, 575, 578–580, 584–585; 296/37.8, 37.16; D12/416
See application file for complete search history.

(56) References Cited

U.S. PATENT DOCUMENTS

| | | | |
|---|---|---|---|
| 5,040,763 A * | 8/1991 | Wilson | B62J 17/00 224/275 |
| D432,075 S * | 10/2000 | Hassett | D12/416 |
| 9,428,115 B2 * | 8/2016 | Seifert | B60R 7/005 |

(Continued)

*Primary Examiner* — Scott T McNurlen
(74) *Attorney, Agent, or Firm* — Elizabeth Yang

(57) ABSTRACT

A footwear and accessory retention pouch serves to segregate and retain footwear and accessories in an organized, accessible manner in a vehicle. The pouch is specially adapted for suspension between the seatbacks of a vehicle having individual or split seats. The pouch comprises a container defined by container sidewalls that form an opening at one end, and at least one interior barrier that segregates the container into chambers that receive footwear. A depressed cap covers the opening in the container. The depressed cap comprises cap sidewalls and a cap platform for retaining an accessory while the cap is covering the opening in container. A rechargeable recharging device operatively connects to the depressed cap for charging a communication device. A plurality of straps and a central adjustable cable are length adjustable and extend from the sidewalls of the container for fastening container between, behind, or in front of the vehicle seats.

4 Claims, 3 Drawing Sheets

(56) References Cited

U.S. PATENT DOCUMENTS

| | | | |
|---|---|---|---|
| 2008/0231063 A1* | 9/2008 | Bowers | A45F 5/02 296/1.07 |
| 2010/0200350 A1* | 8/2010 | Henry | A45C 3/12 190/109 |
| 2012/0286718 A1* | 11/2012 | Richards | A45F 3/04 320/103 |
| 2016/0095400 A1* | 4/2016 | Lawton | A45C 3/12 206/292 |
| 2016/0145035 A1* | 5/2016 | Bates | B65D 85/187 206/292 |
| 2017/0015252 A1* | 1/2017 | Tchetgen | B60R 7/043 |
| 2017/0036610 A1* | 2/2017 | Hotio | B60R 7/043 |

* cited by examiner

FOOTWEAR AND ACCESSORY RETENTION POUCH FOR USE IN VEHICLES

FIELD OF THE INVENTION

The present invention relates generally to a footwear and accessory retention pouch for use in vehicles. More so, the present invention relates to a footwear and accessory retention pouch for segregating and retaining footwear and accessories is specially adapted for suspension between the seatbacks of a vehicle having individual or split seats; whereby a container is defined by container sidewalls that form an opening at one end, and at least one interior barrier that segregates the footwear inside the container; whereby a depressed cap covers the opening in the container and comprises sidewalls and a platform for retaining an accessory; whereby a rechargeable charger operatively connects to the pouch for charging a communication device; whereby two straps extending from the sidewalls of the container allow adjustable attachment to the head restraint support posts of the opposing seats of a vehicle.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, various bags and pouches have been designed to hold foldable shoes so that a user may carry such shoes within a bag or a purse, while wearing conventional shoes, until such a time that the shoes are desired. Then, when desired, the shoes can be removed from the bag or pouch and used. The prior art further provides tote bags to place the conventional shoes in while the shoes are being worn.

Plastic packages are widely used for a variety of items ranging from food to hardware. These packages allow the visual display of product to the prospective customer allowing customer evaluation prior to purchase without opening the package. Some plastic packages have the added feature of recloseability and storage of unused product.

The placement of footwear and personal accessories in an automotive vehicle often presents problems for the user. Placement on a seat prevents use of that seat by a passenger and the footwear or personal accessory is subject to tipping over or even sliding off the seat during breaking maneuvers due to the momentum of the bag.

Placement on the floor of the vehicle often results in the bag being out of reach of the driver and still subject to tipping. Placement on a console between the seats of a vehicle having individual front seats may prevent use of the console as an armrest, interfere with vehicle controls on the console, and be subject to tipping over or sliding off the console during braking or acceleration of the vehicle.

Other proposals have involved show and accessory holders in vehicles. The problem with these holders is that they do not retain both shoes and accessories in a clearly viewable, and secure manner between the seats of a vehicle. Also, they do not allow for recharging of a phone. Even though the above cited holders meet some of the needs of the market, a footwear and accessory retention pouch for use in vehicles that segregates and retains footwear and accessories and is specially adapted for suspension between the seatbacks of a vehicle having individual or split seats is still desired.

SUMMARY

Illustrative embodiments of the disclosure are generally directed to a footwear and accessory retention pouch for use in vehicles. The footwear and accessory retention pouch serves to segregate and retain footwear and accessories in an organized, accessible manner. The pouch is specially adapted for suspension between the seatbacks of a vehicle having individual or split seats.

In some embodiments, the pouch comprises a container defined by container sidewalls that form an opening at one end, and at least one interior barrier that segregates the container into a plurality of chambers that are sized and dimensioned to receive footwear. A depressed cap covers the opening in the container. The depressed cap comprises cap sidewalls and a cap platform for retaining an accessory while the cap is covering the opening in the container.

In some embodiments, a rechargeable recharging device operatively connects to the depressed cap for charging a communication device. A plurality of straps extend from the sidewalls of the container for fastening the container between, behind, or in front of the vehicle seats. The straps allow adjustable attachment to the head restraint support posts of the opposing seats of a vehicle.

In one aspect, a footwear and accessory retention pouch, comprises:
 a container defined by a base end and container sidewalls that form a cavity, the container further defined by an open end that forms an opening;
 at least one interior barrier that segregates the cavity of the container into a plurality of chambers;
 a depressed cap configured to detachably cover the opening in the container, the depressed cap defined by cap sidewalls and a cap platform;
 a rechargeable recharging device operatively connected to the depressed cap;
 a plurality of straps extending from the container sidewalls of the container, the plurality of straps configured to enable adjustable attachment to head restraint support posts of opposing seats of a vehicle.

In another aspect, the container has a generally rectangular shape.

In another aspect, the container is opaque or at least partially transparent.

In another aspect, the container comprises a polyethylene, a polyurethane, a polyvinyl chloride, and vinyl.

In another aspect, the container is resilient.

In another aspect, the at least one interior barrier is disposed lengthwise along the container.

In another aspect, the plurality of chambers are sized and dimensioned to receive footwear.

In another aspect, the platform of the depressed cap has a generally rectangular shape.

In another aspect, the platform of the depressed cap is configured to support an accessory.

In another aspect, the depressed cap form a friction fit relationship with the open end of the container.

In another aspect, the rechargeable recharging device is a phone charger.

In another aspect, the plurality of straps comprises two straps.

In another aspect, the plurality of straps further comprises a buckle.

One objective of the present invention is to provide a pouch for retaining and segregating footwear in a vehicle.

Another objective is to provide a pouch having a depressed cap that supports accessories in a vehicle.

Yet another objective is to enable clear visibility and quick access to the footwear in the container.

Yet another objective is to provide a pouch that will not spill its contents when turning or stopping a vehicle.

Yet another objective is to provide a pouch for retaining footwear that can also hold other items, such as keys on a depressed cap.

Yet another objective is to provide adjustable straps that enable the pouch to be fastened between two seats in a vehicle.

Yet another objective is to provide a pouch that can attach to integral head posts or adjustable head posts in a seat of a vehicle.

Yet another objective is to provide an inexpensive to manufacture footwear and accessory retention pouch for use in a vehicle.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
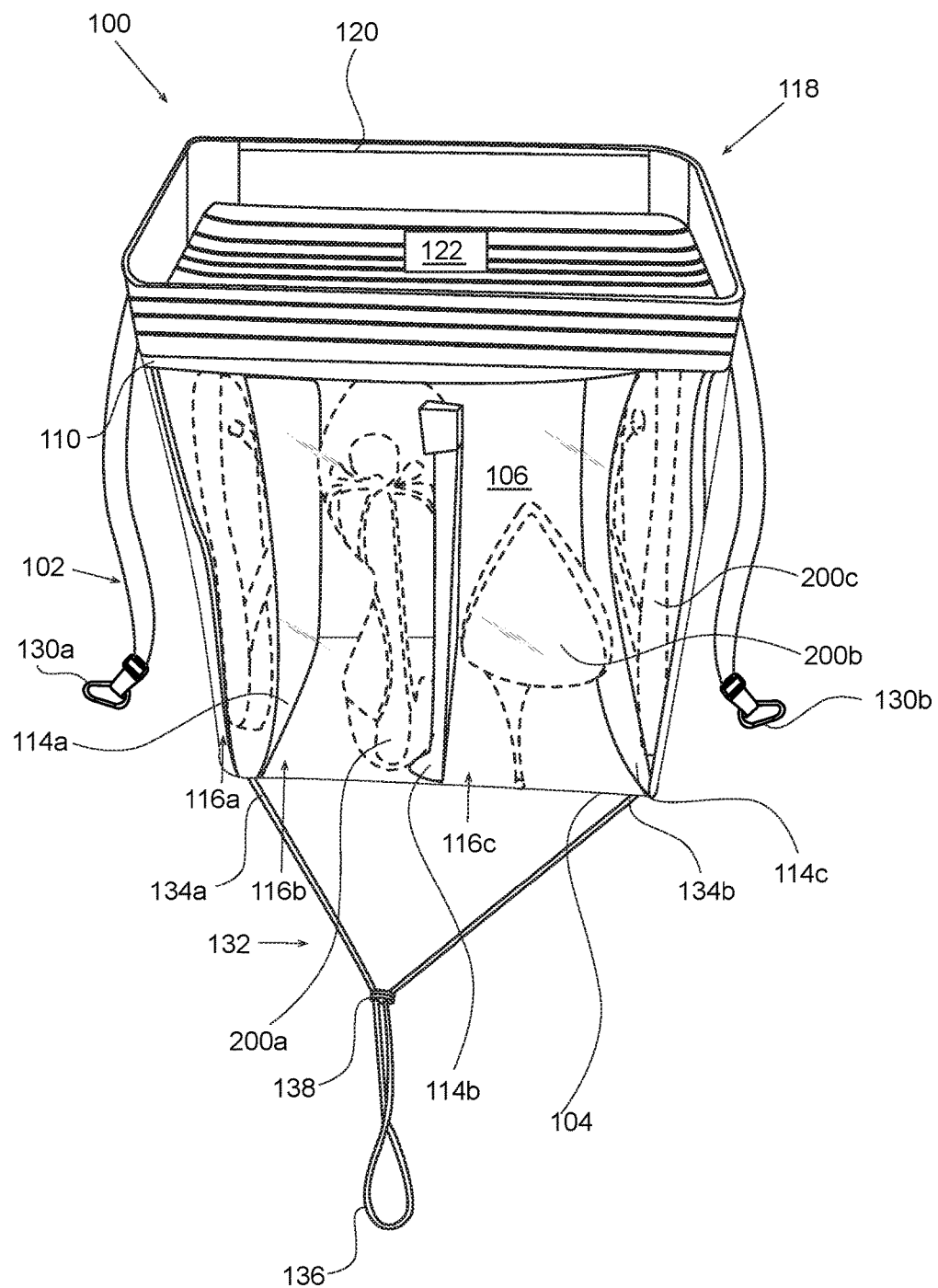
FIG. 1 illustrates a perspective view of an exemplary footwear and accessory retention pouch, in accordance with an embodiment of the present invention.
Figure 2:
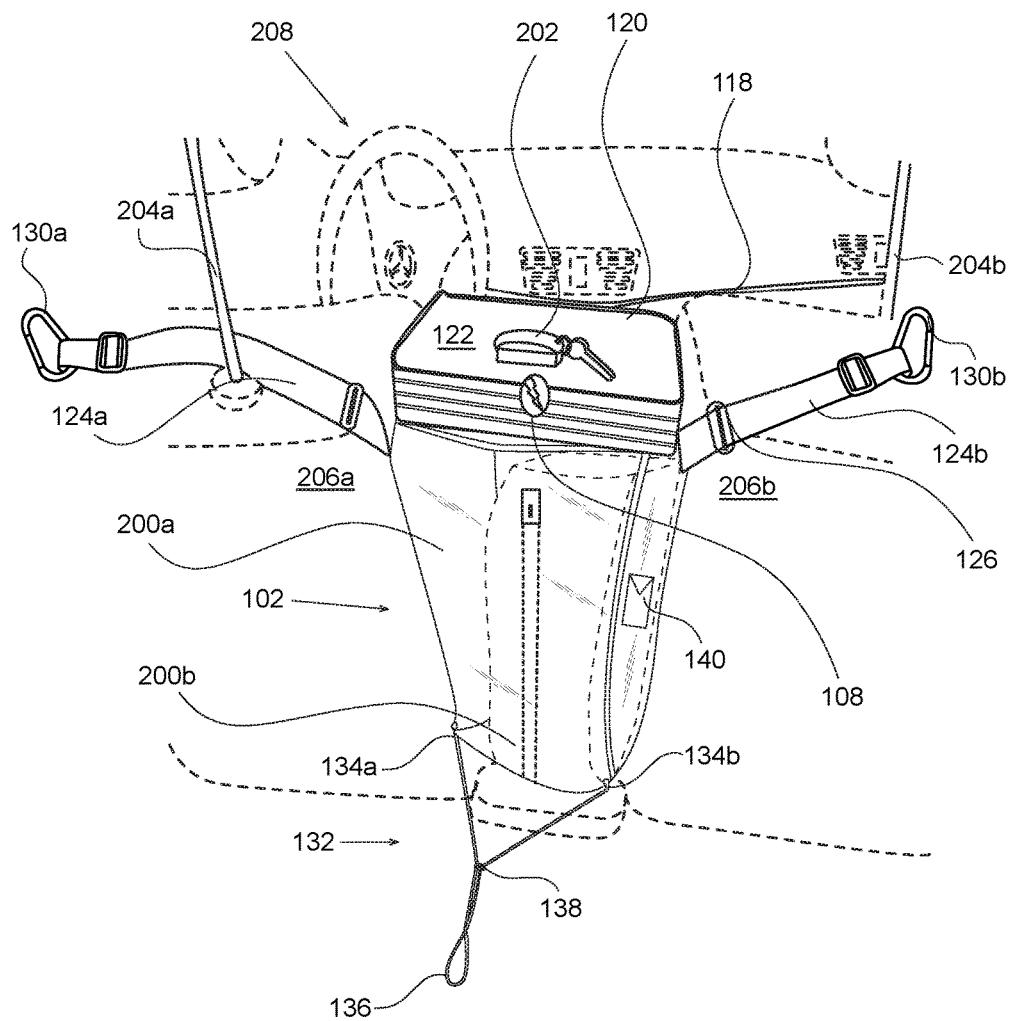
FIG. 2 illustrates a rear perspective view of the footwear and accessory retention pouch shown in FIG. 1, fastened between two seats in the vehicle, and from the perspective of the rear seat of a vehicle, in accordance with an embodiment of the present invention.
Figure 3:
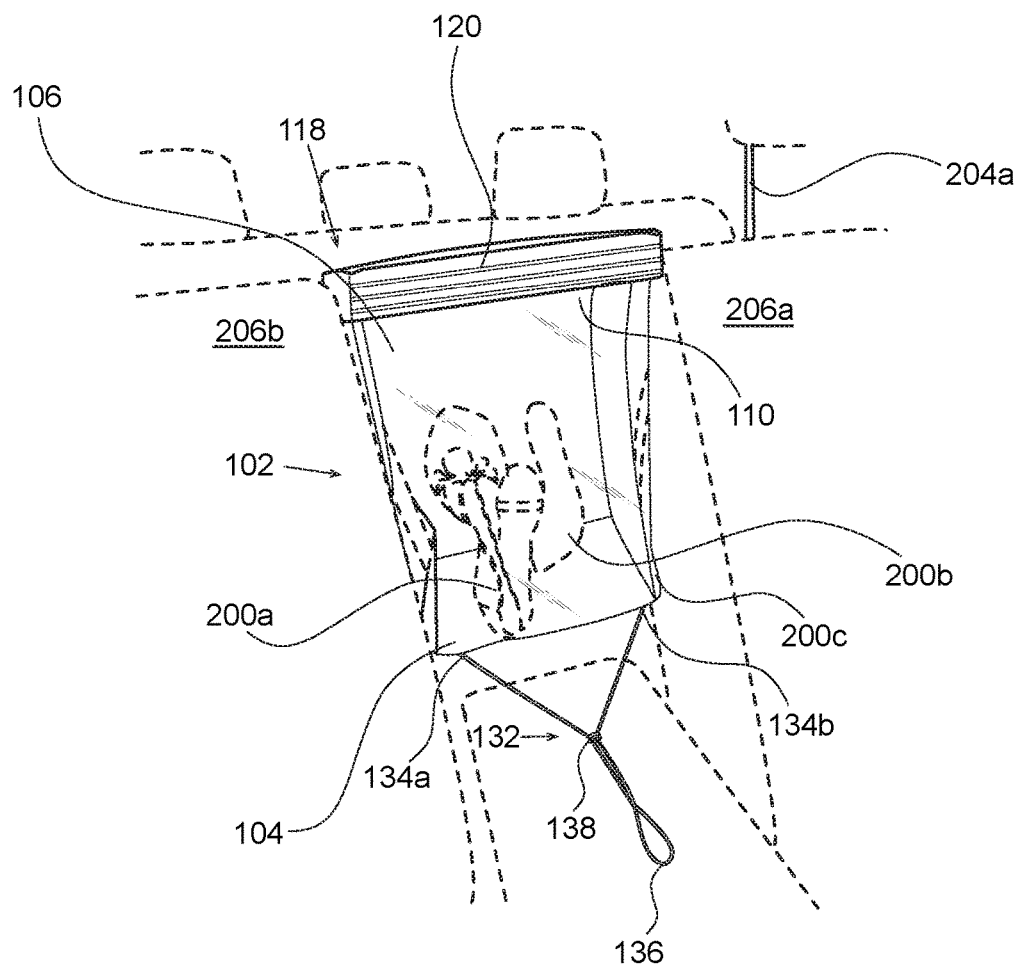
FIG. 3 illustrates a front perspective view of the footwear and accessory retention pouch shown in FIG. 1, fastened between two seats in the vehicle, and from the perspective of the front seat of a vehicle, in accordance with an embodiment of the present invention.

A footwear and accessory retention pouch 100 for use in vehicles is referenced in FIGS. 1-3. The footwear and accessory retention pouch 100, hereafter "pouch 100" houses footwear of eclectic styles and sizes and accessories in an organized, accessible manner with a vehicle. The pouch 100 positions the footwear 200a, 200b, 200c and accessory 202 for ready access by either the driver or passenger. The pouch 100 is specially adapted for suspension between the seatbacks of a vehicle 208 having individual or split seats 206a, 206b.

Those skilled in the art will recognize that the placement of footwear 200a-c and personal accessories 202 in an automotive vehicle 208 often presents problems for the user. Placement on a seat 206a prevents use of that seat by a passenger and the footwear 200a-c or personal accessory 202 is subject to tipping over or even sliding off the seat 206a during breaking maneuvers due to the momentum of the footwear container.

Thus, the present disclosure of the footwear and accessory retention pouch 100 is configured to securely and organizationally retain the footwear 200a-c in organized adjacent, upright position in a container 102; while also holding accessories on a depressed cap 118 that covers the container 102. Recharging capacity for a communication device is yet another unique feature that the pouch 100 offers.

As referenced in FIG. 1, the pouch 100 comprises a container 102 that is the primary storage component for the footwear 200a-c. The container 102 is defined by a base end 104 and container sidewalls 106 that form a cavity. The container 102 is further defined by an open end 110 that is oppositely disposed from the base end, and forms an opening for access into the cavity of the container 102. The container sidewalls 106 run lengthwise to form a generally elongated container 102 that matches the generally elongated characteristics of footwear 200a-c. The base end 104 forms a closure to the sidewalls 106, so as to provide only one outlet for the footwear 200a-c. The sidewalls 106 may be opaque or at least partially. If at least partially transparent, then the container enables clear visibility to the contents therein. In one alternative embodiments, a pocket 140 may form in sidewalls to store items.

In some embodiments, the container 102 may have a generally rectangular shape. Though in other embodiments, the container 102 may be cubicle, spherical, or pyramidal in shape. In any case, the container 102 is sufficiently sized to contain footwear. The container 102 is scalable to be sized for children or adult footwear. In other embodiments, the container 102 is resilient, so as to conform to the various shapes and sizes of footwear. Suitable materials for the container 102 may include, without limitation, comprises a polyethylene, a polyurethane, a polyvinyl chloride, and vinyl.

In some embodiments, at least one interior barrier 114a, 114b, 114c is disposed along the length of the cavity of the container. The interior barrier 114a, 114b, 114c segregates the cavity of the container 102 into a plurality of chambers 116a, 116b that are sized and dimensioned to receive footwear. Each chamber may be the same size, or there may be different sizes to accommodate different footwear 200a-c. For example, FIG. 1 shows two central chambers 116b, 116c that contain standard female pumps and high heel shoes; and a thinner side chamber 116a that retains a flip flop sandal. This segregation of footwear 200a-c can be useful for carrying different footwear for different users on a trip in a vehicle.

In some embodiments, a depressed cap 118 serves to detachably cover the opening that forms in the open end 110 of the container 102. The depressed cap 118 forms a friction fit relationship with the opening, so that the depressed cap 118 easily comes on and off the open end 110 as the contents in the container 102 are needed.

In one embodiment, the depressed cap 118 is defined by cap sidewalls 120 and a cap platform 122. The cap platform 122 is normal to the cap sidewalls 120. In this manner, the cap platform 122 provides a stable, level surface for retaining an accessory 202 while the depressed cap 118 covers the opening in the container 102. Further, the cap sidewalls 120 serve as barriers to prevent the accessory 202 from sliding off the cap platform 122 as the vehicle turns, stops, and accelerates. The accessory 202 may include, without limitation, a key, a phone, a drinking vessel, food, a map, and a vehicle related item.

In some embodiments, a rechargeable recharging device 108 operatively connects to the depressed cap 118 for charging a communication device. In one possible embodiment, the rechargeable recharging device 108 is a phone charger. In this manner, the communication device can rest on the platform of the depressed cap 118 while being charged by the proximally located rechargeable recharging device 108. Though in other embodiments, the rechargeable recharging device 108 may be configured for charging a laptop, a hair shaving device, and a hand-held electrical component. In one alternative embodiment, the rechargeable recharging device 108 is charged directly by a vehicle battery.

Turning now to FIG. 2, a plurality of straps 124a, 124b extend from the container sidewalls 106. The strap[s 124a-b work to fasten the container 102 between, behind, or in front of the vehicle seats. The straps 124a, 124b extend from the container 102 sidewalls of the container 102 to form free ends. The straps 124a, 124b are configured to enable adjustable attachment to head restraint support posts 204a-b of opposing seats 206a-b of the vehicle 208. Though, it is significant to note that the pouch is also secured into a fixed position between the seats 206a-b from the pressure of both seats 206a-b on either side of the container 102. The straps 124a-b may be effective for retaining the pouch from tipping or sliding forward or backwards from the motion of the vehicle 208.

Looking back at FIG. 1, a pair of straps 124a-b and a central adjustment cable 132 extend from pouch 100. As shown, two oppositely disposed straps 124a, 124b extend from the container sidewalls 106, proximal to the open end 110 of the container 102. Each free end of the strap 124a-b wraps around a respective head restraint support post 204a-b. This can be useful for securely retaining the container 102 between seats 206a-b, and thereby preventing the footwear 200a-c in the chambers 116a, 116b of the container 102, and the accessory 202 resting in the depressed cap 118 from spilling out.

In some embodiments, a buckle 126 may be used to adjust the length of the straps 124a-b. The free ends 128a, 128b of the straps 124a-b pass through the buckle 126 before the buckle 126 is cinched to restrain further sliding by the straps 124a-b. Though in other embodiments, a D-ring, a ratcheting mechanism, or a simple tied knot may be used to adjust the length of the straps 124a, 124b. In this manner, the straps 124a-b allow adjustable attachment to the head restraint support posts 204a, 204b of the opposing seats 206a, 206b of a vehicle 208.

In some embodiments, the straps 124a-b may serve as dual purpose adjustable shoulder straps that can wrap around a shoulder so that a user can carry the container 102 on the back or shoulder. This dual purpose mode can be useful for converting between a vehicle affixed pouch, and a mobile pouch. Free ends 128a-b of straps 124a-b can include a fastening mechanism 130a, 130b, such as a carbineer that locks the straps around the shoulder or back of user. In this manner, the straps are adapted to convert the pouch 100 to a shoulder bag or a back pack.

In some embodiments, pouch 100 may also utilize a central adjustable cable 132 that extends from the container sidewalls 106. The central adjustable cable 132 helps stabilizes the container 102 on a central console of the vehicle 208. The central adjustable cable 132 works with straps 124a-b to retain container 102 in place between the seats 206a-b. In some embodiments, central adjustable cable 132 is defined by a pair of fixed ends 134a, 134b that attach to sidewall of container, and a free end 136 that wraps around central console of vehicle 208. Central adjustable cable 132 may form a loop from fixed ends 134a-b to free end 136. A cinch fastener 134 slides along the length of the central adjustable cable 138 to adjust the length thereof.

For example, FIG. 3 shows the container 102 firmly strapped between two front seats 206a, 206b of the vehicle 208. The driver or passengers from the front or rear seat 206a have easy access to the container 102 and the depressed cap 118 while in this median location between the seats 206a-b. The driver or passengers may simply turn around, or reach forward (for rear seat passengers) and access the desired footwear 200a-c in the chambers 116a, 116b of the container 102, and the accessory 202 resting on the platform 122 of the depressed cap 118.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A footwear and accessory retention pouch, the pouch comprising:

a container defined by a base end and container sidewalls that form a cavity, the container further defined by an open end that forms an opening;

at least one interior barrier that segregates the cavity of the container into a plurality of chambers;

a depressed cap configured to detachably cover the opening in the container, the depressed cap defined by cap sidewalls and a cap platform;

a plurality of straps extending from the container sidewalls of the container, the plurality of straps configured to enable adjustable attachment to head restraint support posts of opposing seats of a vehicle;

a rechargeable recharging device operatively connected to the depressed cap;

a central adjustable cable defined by a pair of fixed ends that attach to the container sidewalls, the central adjustable cable further defined by a free end; and a cinch fastener configured to slide along a length of the central adjustable cable, whereby the cinch fastener adjusts the length of the central adjustable cable.

2. The pouch of claim 1, further comprising a pocket formed in the container sidewalls.

3. The pouch of claim 1, wherein the plurality of straps comprise a buckle.

4. A footwear and accessory retention pouch, the pouch consisting of:

a container defined by a base end and container sidewalls that form a cavity, the container further defined by an open end that forms an opening, the container sidewalls being opaque or at least partially transparent, the container sidewalls forming a pocket;

at least one interior barrier that segregates the cavity of the container into a plurality of chambers;

a depressed cap configured to detachably cover the opening in the container, the depressed cap defined by cap sidewalls and a cap platform;

a plurality of straps extending from the container sidewalls of the container, the plurality of straps configured to enable adjustable attachment to head restraint support posts of opposing seats of a vehicle, the plurality of straps comprising a buckle;

a rechargeable recharging device operatively connected to the depressed cap;

a central adjustable cable defined by a pair of fixed ends that attach to the sidewalls of the container, the central adjustable cable further defined by a free end; and a cinch fastener configured to slide along a length of the central adjustable cable, whereby the cinch fastener adjusts the length and the shape of the central adjustable cable.

* * * * *